US007284472B1

(12) United States Patent
Soellner et al.

(10) Patent No.: US 7,284,472 B1
(45) Date of Patent: Oct. 23, 2007

(54) HYDRAULIC CYLINDER

(75) Inventors: Dan D. Soellner, Storm Lake, IA (US); Stephen Jones, Ida Grove, IA (US)

(73) Assignee: Gomaco Corporation, a division of Godbersen Smith Construction Co., Ida Grove, IA (US)

( * ) Notice: Subject to any disclaimer, the term of this patent is extended or adjusted under 35 U.S.C. 154(b) by 0 days.

(21) Appl. No.: 11/237,635

(22) Filed: Sep. 28, 2005

Related U.S. Application Data

(60) Provisional application No. 60/678,012, filed on May 5, 2005.

(51) Int. Cl.
*F01B 31/12* (2006.01)
*G01R 31/08* (2006.01)

(52) U.S. Cl. ........................... 92/5 R; 324/525
(58) Field of Classification Search ............ 91/1; 92/5 R, 109, 113; 324/207.13, 500, 525, 324/527
See application file for complete search history.

(56) References Cited

U.S. PATENT DOCUMENTS 4,700,610 A * 10/1987 Bauer et al. .................... 91/1
7,023,199 B2 * 4/2006 Blubaugh et al. ......... 324/207.13

* cited by examiner

*Primary Examiner*—Michael Leslie
(74) *Attorney, Agent, or Firm*—Suiter Swantz pc llo

(57) ABSTRACT

A hydraulic cylinder assembly includes a transducer having a wand and a wiper assembly, wherein the wiper assembly is positioned a predetermined distance from an end of the wand for providing a desired startup resistance. A tube includes a piston contained therein for actuation between the first end of the tube and the second end of the tube. A rod is operatively attached to the piston. The piston and the rod are movable together between the first and second ends of the tube. The second end of the tube includes the transducer for monitoring the position of the piston with respect to the second cap member. The wand extends into the piston, and the transducer senses the position of the wiper assembly with respect to the wand for monitoring the position of the piston with respect to the second cap member.

5 Claims, 8 Drawing Sheets

HYDRAULIC CYLINDER

CROSS-REFERENCE TO RELATED APPLICATIONS

The present application claims the benefit under 35 U.S.C. § 119(e) of U.S. Provisional Application Ser. No. 60/678,012, filed May 5, 2005, which is herein incorporated by reference in its entirety. Additionally, U.S. Pat. No. 6,450,048 entitled HYDRAULIC CYLINDER MONITORING APPARATUS is herein incorporated by reference in its entirety.

FIELD OF THE INVENTION

The present invention generally relates to the field of hydraulic piston cylinders, and more particularly to a hydraulic cylinder having a linear transducer for measuring the displacement of the piston.

BACKGROUND OF THE INVENTION

In many applications, hydraulic cylinders are utilized as linear actuators. Linear transducers are typically utilized in these applications to monitor the position of a piston or piston rod contained within the hydraulic cylinder. Because hydraulic cylinders employing linear transducers need to be interchangeable with other hydraulic cylinders, it has been challenging to find a way of installing a linear transducer in a welded cylinder tube while providing access to internal components for serviceability and troubleshooting.

Hydraulic cylinder assemblies, such as the hydraulic cylinder monitoring apparatus disclosed in U.S. Pat. No. 6,450,048, have been provided for supplying a linear transducer with a hydraulic cylinder. While this solution works well, it employs a supplemental end cap bolted to an end cap at the base end of the cylinder. Moreover, when the cylinder is collapsed, the wiper assembly is positioned at an end of the linear transducer proximal to the base end of the cylinder. In such a configuration, start-up resistance must be provided to ensure that the electrical circuit including the linear transducer is correctly configured. Previously, to provide this start-up resistance, resistors have been added to the electrical circuit. However, this solution requires additional components, adding to the complexity of the resulting cylinder assembly. Thus, it would be desirable to provide a hydraulic cylinder assembly which includes a linear transducer, wherein the cylinder assembly does not employ a supplemental end cap so that the cylinder assembly is more easily assembled and disassembled, and wherein the cylinder assembly does not require resistors for providing an initial start-up resistance.

SUMMARY OF THE INVENTION

Accordingly, the present invention is directed to a hydraulic cylinder assembly including a linear transducer having a wand and a wiper assembly, wherein the wiper assembly is positioned a pre-determined distance from an end of the wand for providing a desired startup resistance. In exemplary embodiments, the hydraulic cylinder assembly includes a tube having a first cap member for closing a first end of the tube, and a second cap member for closing a second end of the tube. A piston is slidably contained within the tube for actuation between the first end of the tube and the second end of the tube. A rod is operatively attached to the piston and extends from the piston through an opening in the first cap member. The piston and the rod are movable together between the first end of the tube and the second end of the tube. The second end of the tube includes the transducer for monitoring the position of the piston with respect to the second cap member. The transducer includes a wand and a wiper assembly, which complete an electric circuit for sensing the position of the wiper assembly with respect to the wand and monitoring the position of the piston with respect to the base end. The wiper assembly is positioned a pre-determined distance from an end of the wand when the piston is in the second position at the base end of the cylindrical tube. By positioning the wiper assembly a pre-determined distance from the end of the wand, a desired startup resistance is provided.

In one exemplary embodiment wherein the wiper assembly is positioned on a side of the piston opposite the base end, the wand of the linear transducer extends out of the cylindrical tube past the effective depth of the cylinder for measuring the position of the piston with respect to the base end. In another exemplary embodiment wherein the wiper assembly is positioned on the other side of the piston (proximal to the base end), the transducer is inserted through the second cap member and covered with a supplemental cap, or the like.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
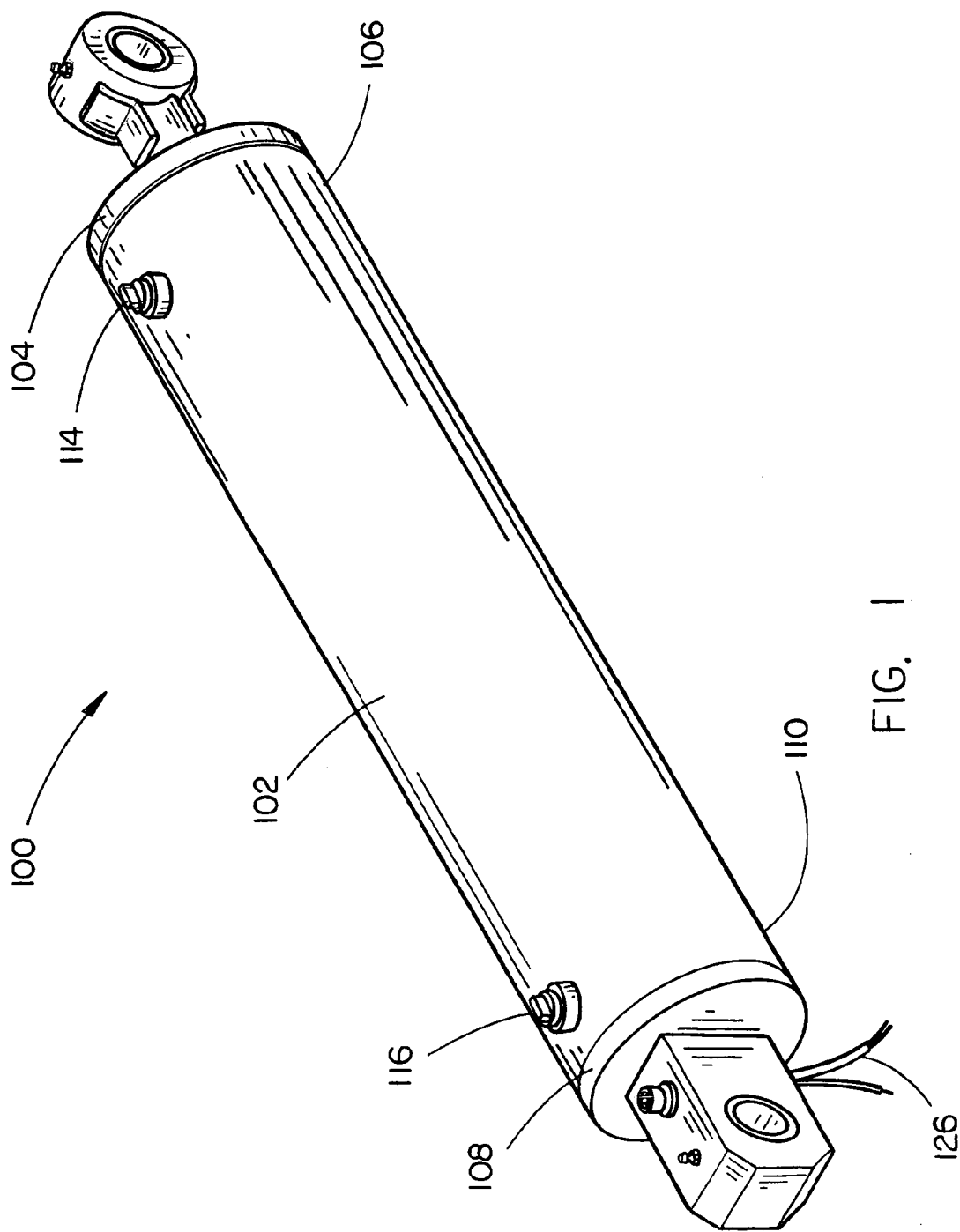
FIG. 1 is an isometric view illustrating a hydraulic cylinder assembly in accordance with an exemplary embodiment of the present invention.
Figure 2:
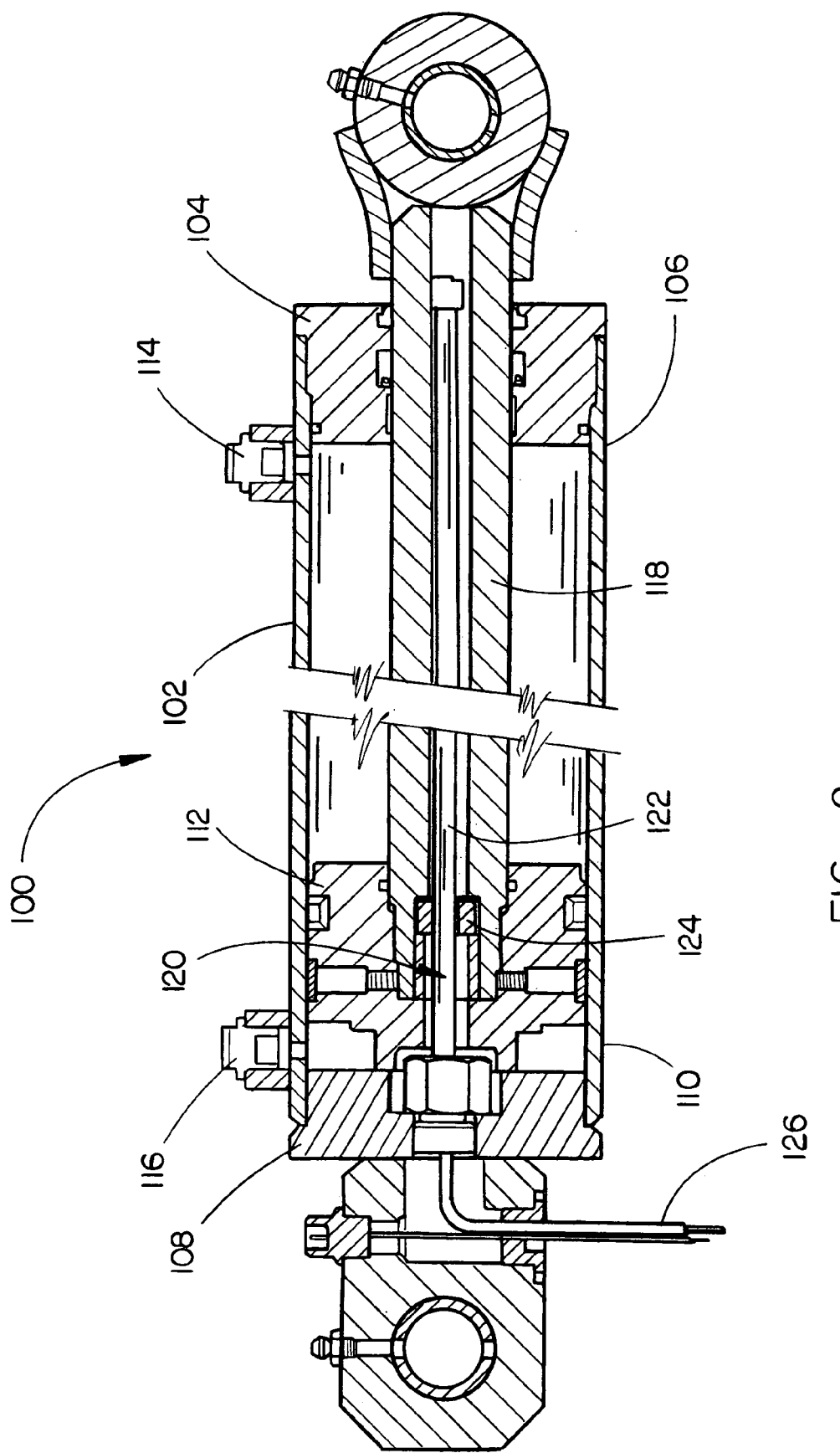
FIG. 2 is a cross-sectional side elevation view of the hydraulic cylinder assembly illustrated FIG. 1.
Figure 3:
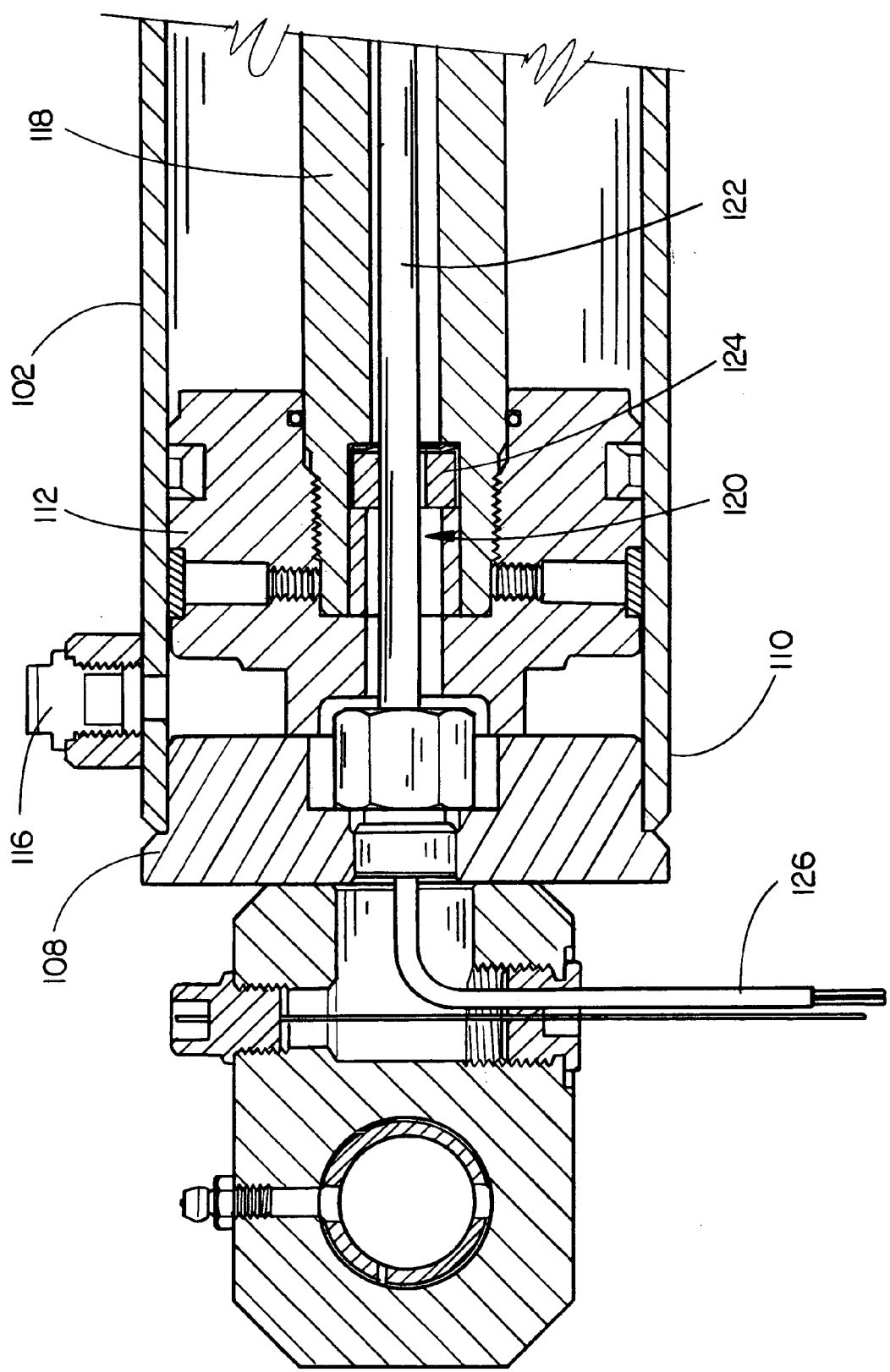
FIG. 3 is a partial cross-sectional side elevation view of the hydraulic cylinder assembly illustrated FIG. 1.
Figure 4:
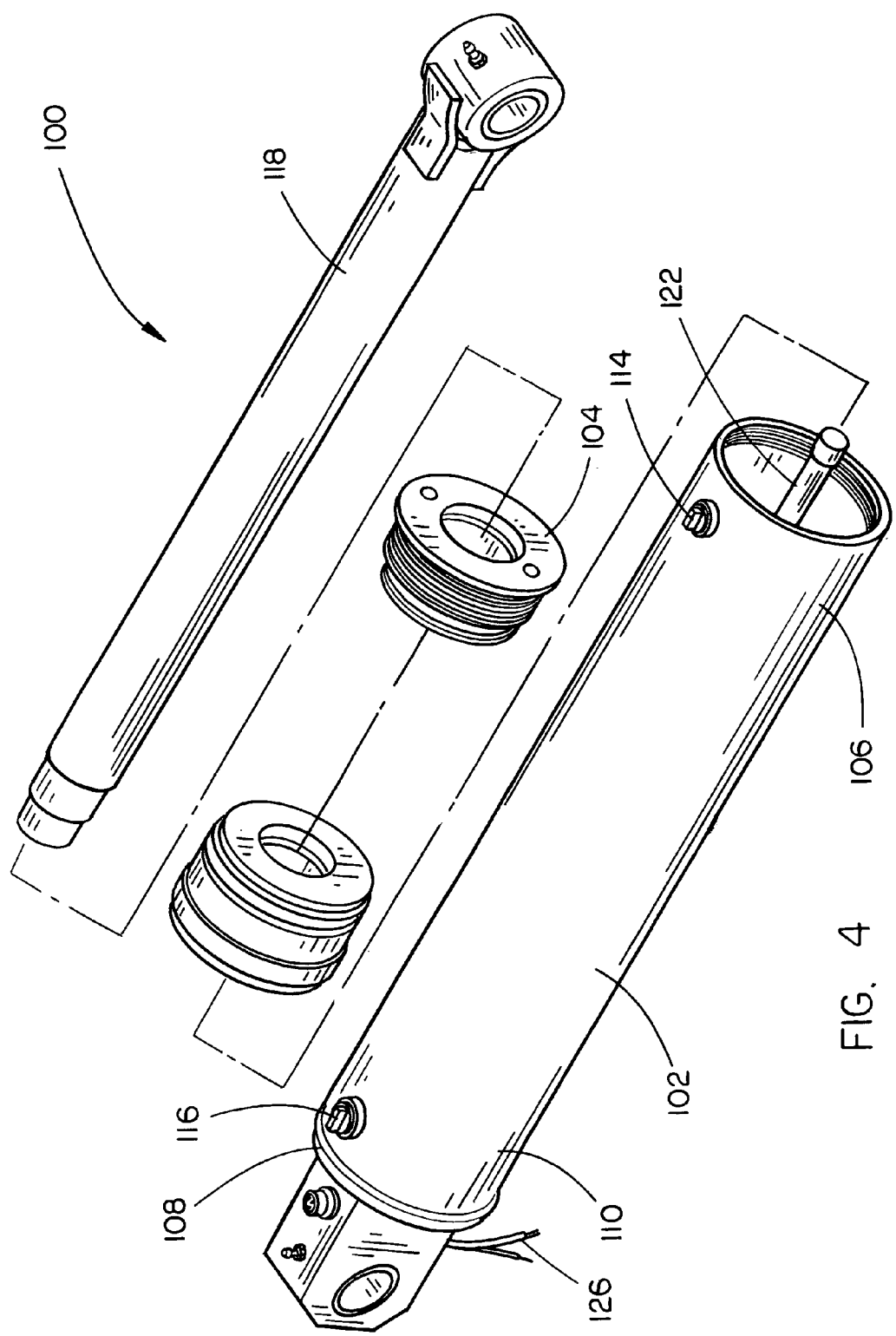
FIG. 4 is an isometric view of the hydraulic cylinder assembly illustrated FIG. 1, wherein an assembly technique is illustrated.
Figure 5:
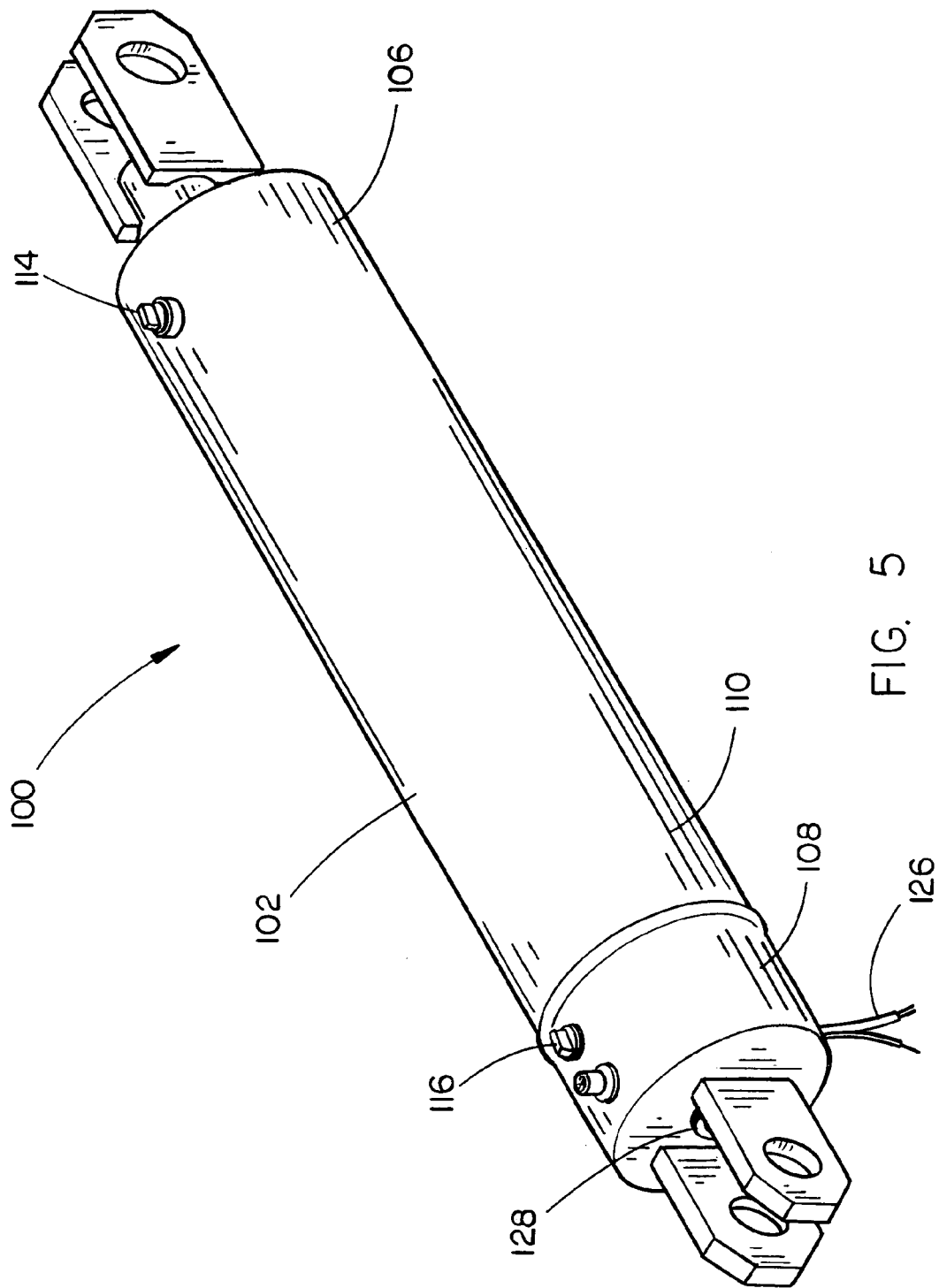
FIG. 5 is an isometric view illustrating a hydraulic cylinder assembly in accordance with another exemplary embodiment of the present invention.
Figure 6:
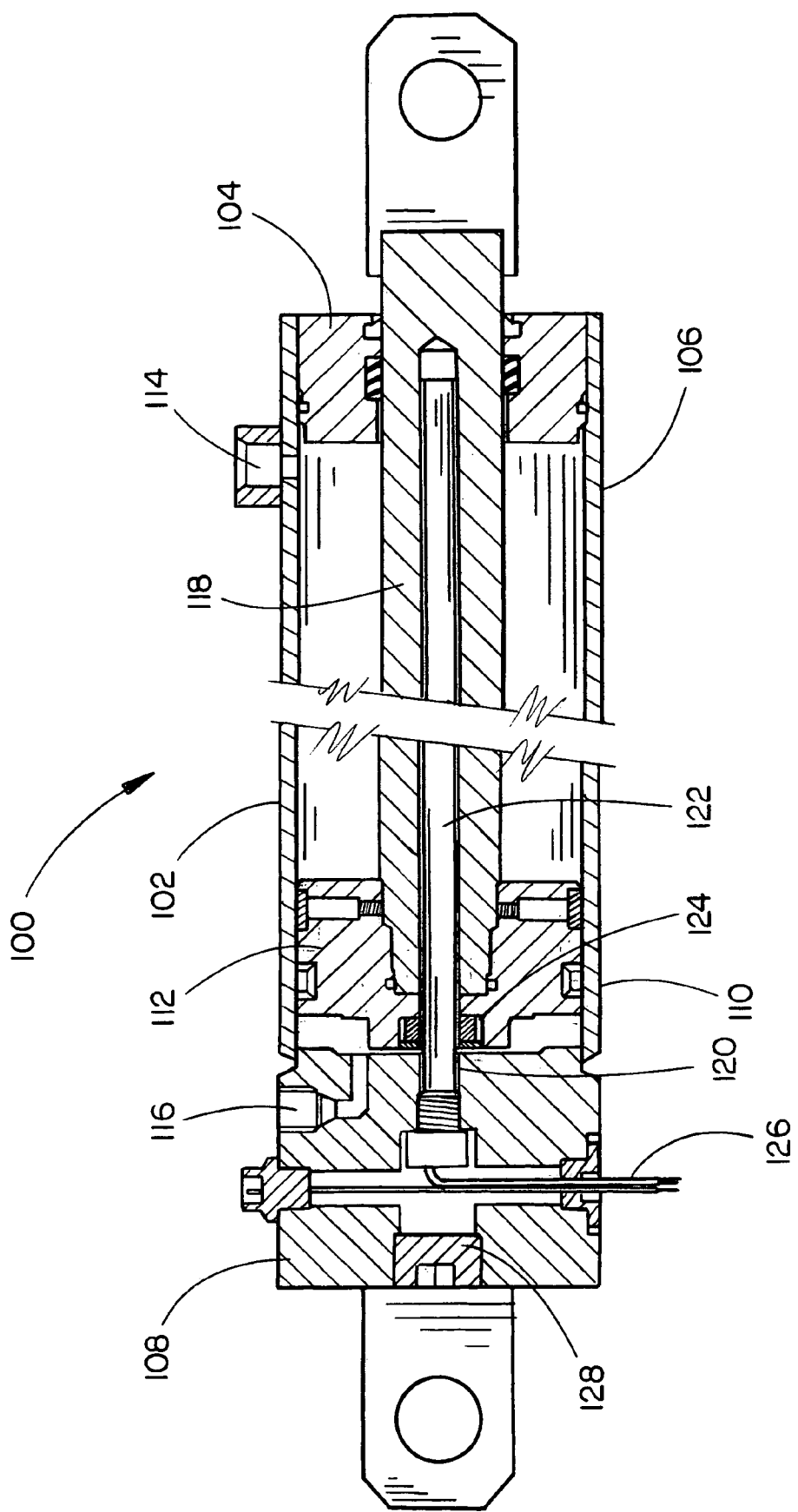
FIG. 6 is a cross-sectional side elevation view of the hydraulic cylinder assembly illustrated FIG. 5.
Figure 7:
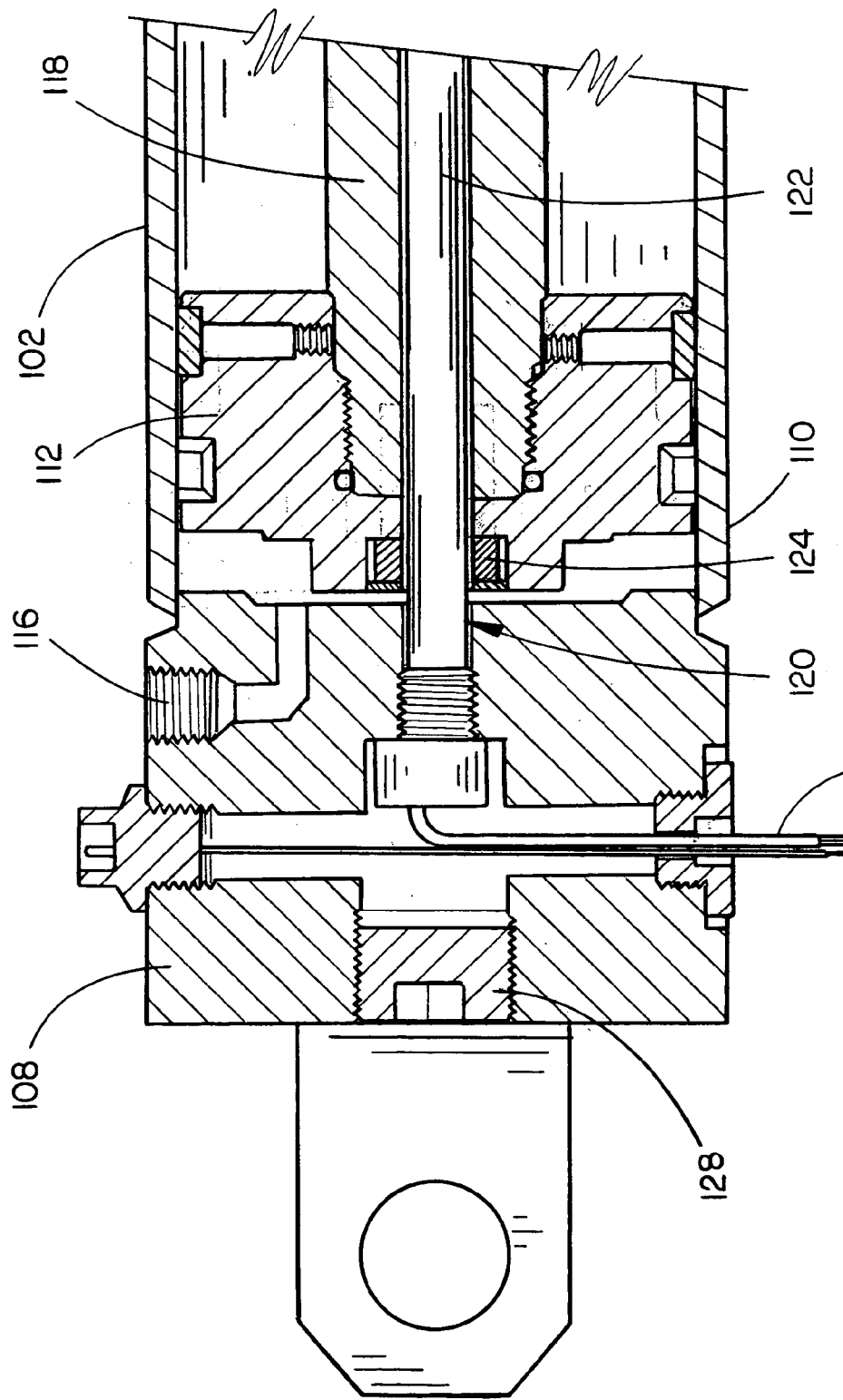
FIG. 7 is a partial cross-sectional side elevation view of the hydraulic cylinder assembly illustrated FIG. 5.
Figure 8:
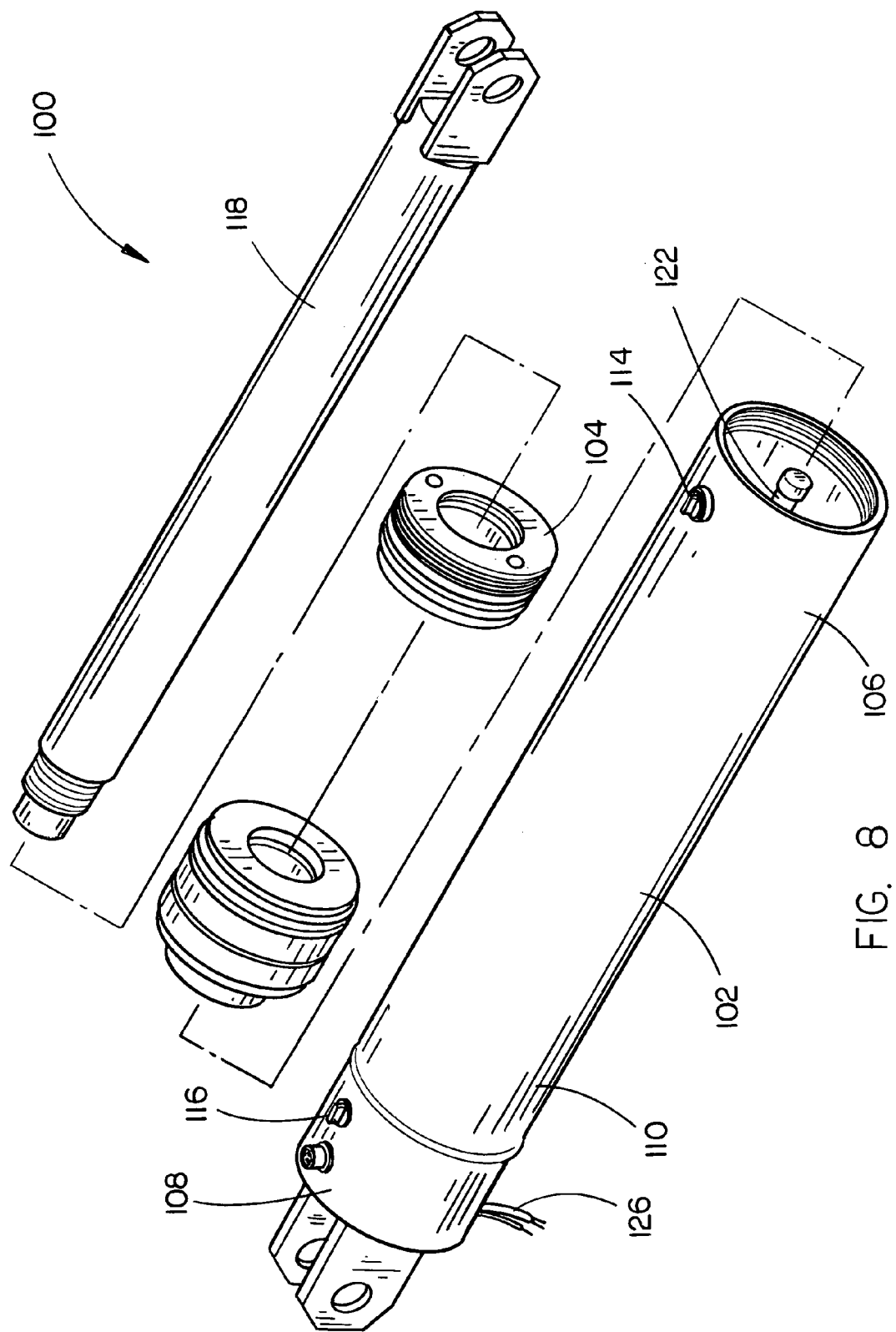
FIG. 8 is an isometric view of the hydraulic cylinder assembly illustrated FIG. 5, wherein an assembly technique is illustrated.

Referring to FIGS. 1 through 8, a hydraulic cylinder assembly 100 is described in accordance with exemplary embodiments of the present invention. The hydraulic cylinder assembly 100 includes a tube, such as a cylindrical tube 102, having a first cap member 104 for closing a first end 106 of the cylindrical tube 102, and a second cap member (base end) 108 for closing a second end 110 of the cylindrical tube 102. A piston 112 is sealed within the cylindrical tube 102 for movement between a first position at the first end 106 of the cylindrical tube 102, and a second position at the second end 110 of the cylindrical tube 102. In embodiments, the piston 112 is slidably contained within the cylindrical tube 102 for actuation (e.g., hydraulic actuation). A first port, such as a first hydraulic port 114, is located on the cylindrical tube 102 to one side of the piston 112, while a second port, such as a second hydraulic port 116, is located on the cylindrical tube 102 to the other side of the piston 112. In embodiments, the first hydraulic port 114 and the second hydraulic port 116 are of the type generally found on hydraulic cylinders, where hydraulic pressure in one port and exhaust in the other port will result in movement of the piston 112 in one direction, while reversing the hydraulic pressure and exhaust in these ports will result in movement of the piston 112 in the other direction.

A rod 118 is operatively attached to the piston 112 and extends from the piston 112 through an opening in the first cap member 104. Thus, the piston 112 and the rod 118 are movable together between the first position at the first end 106 of the cylindrical tube 102 and the second position at the second end 110 of the cylindrical tube 102. The second end 110 of the cylindrical tube 102 includes a transducer, such as a linear transducer 120, or another type of transducer, for monitoring the position of the piston 112 with respect to the second cap member 108. For instance, in one embodiment, the linear transducer 120 comprises a resistive transducer and a potentiometer utilizing electrical resistance to determine the position of the transducer. However, in other embodiments, the linear transducer 120 may alternatively comprise a magneto-restrictive transducer utilizing magnetism to determine the position of the transducer. It is contemplated that various other transducers for sensing position may be utilized as well without departing from the scope and intent of the present invention. Those of skill in the art will appreciate that because the linear transducer 120 may be subjected to hydraulic pressure within the cylindrical tube 102, a seal, such as an O-ring seal, or the like, may be provided for sealing the linear transducer 120 against the second end 110 of the cylindrical tube 102.

In embodiments, the linear transducer 120 includes an elongated portion, such as a wand 122, fixed with respect to the second cap member 108; and a follower member, such as a wiper assembly 124, fixed with respect to the piston 112. The wand 122 extends longitudinally through the cylindrical tube 102, and the wiper assembly 124 is movable along the wand 122. The wiper assembly 124 is positioned a predetermined distance from an end of the wand 122 when the piston 112 is in the second position at the second end 110 of the cylindrical tube 102. By positioning the wiper assembly 124 a pre-determined distance from the end of the wand 122, a desired startup resistance may be provided. Startup resistance may be measured for providing broken electrical wire diagnostics, and/or detecting an open fault or short. In general, startup resistance may be used for correctly configuring the electrical circuit including the linear transducer. In one specific embodiment, the wand 122 extends into the rod 118 connected to the piston 112, and the wand 122 and the wiper assembly 124 of the linear transducer 120 complete an electric circuit for sensing the position of the wiper assembly 124 with respect to the wand 122 and monitoring the position of the piston 112 with respect to the second cap member 108. For example, by connecting electrical leads 126 to the linear transducer 120 and measuring the resistance of the circuit formed by the wand 122 and the wiper assembly 124, the distance of the piston 112 from the base end may be determined. In another specific embodiment, the wand 122 and the wiper assembly 124 of the linear transducer 120 may utilize magnetism for sensing the position of the wiper assembly 124 with respect to the wand 122. For instance, by connecting electrical leads 126 to the linear transducer 120 and measuring magnetic flux in the magnetic circuit formed by the wand 122 and the wiper assembly 124, the distance of the piston 112 from the base end may be determined.

In an exemplary embodiment, the wand 122 of the linear transducer 120 extends past the effective depth of the cylinder (e.g., beyond the first end 106 of the cylindrical tube 102). In one specific configuration, illustrated in FIGS. 1 through 4, wherein the wiper assembly 124 extends past the effective depth of the cylinder when the piston 112 is in the first position at the first end 106 of the cylindrical tube 102, this allows the linear transducer 120 to measure the position of the wiper assembly 124 with respect to the wand 122 as the piston 112 moves between the first position at the first end 106 of the cylindrical tube 102 and the second position at the second end 110 of the cylindrical tube 102. Thus, the distance of the piston 112 from the base end may be measured at any position throughout the length of the cylindrical tube 102. This configuration also facilitates engagement of the wiper assembly 124 onto the wand 122 during assembly of the hydraulic cylinder assembly 100. In such a configuration, the rod 118 may be hollow (e.g., gun-drilled, or the like) for accommodating the wand 122 of the linear transducer 120. In other embodiments, the rod 118 may include a partial bore extending longitudinally through the rod 118 for accommodating the wand 122. Those of skill in the art will appreciate that the rod 118 may be formed in a variety of ways for accommodating the wand 122. Moreover, it will be appreciated that the wiper assembly 124 may be retained by the rod 118 as well as being retained by the piston 112.

Preferably, the first cap member 104 is removable from the first end 106 of the cylindrical tube 102 for selectively closing the first end 106 of the cylindrical tube 102. For instance, in a specific embodiment, the first cap member 104 is threadably attached to the first end 106 of the cylindrical tube 102. Those of skill in the art will appreciate that the first cap member 104 may be removably attached to the first end 106 of the cylindrical tube 102 in a variety of ways without departing from the scope and spirit of the present invention. Moreover, those of skill in the art will appreciate that the first cap member 104 may be fixedly attached to the first end 106 of the cylindrical tube 102 as well. For example, in an alternative embodiment, the first cap member 104 may be welded to the first end 106 of the cylindrical tube 102.

In a specific embodiment, the second cap member 108 is welded to the second end 110 of the cylindrical tube 102, while in an alternative embodiment, the second cap member 108 is threadably attached to the second end 110 of the cylindrical tube 102. It will be appreciated that the second cap member 108 may be attached to the second end 110 of the cylindrical tube 102 in a variety of ways without departing from the scope and intent of the present invention. Further, it will be appreciated that the second cap member 108 may also include a supplemental cap, or the like, for allowing access to components within the cylindrical tube 102. For instance, in a specific embodiment, the second cap member 108 may include a first portion welded to the second end 110 of the cylindrical tube 102, and a second (supplemental) portion connected to the first portion for closing the second end 110 of the cylindrical tube 102 via screws or other fasteners. Those of skill in the art will appreciate that access may be provided to components within the cylindrical tube 102 via the second cap member 108 in a variety ways, without departing from the scope and spirit of the present invention.

In exemplary embodiments, the hydraulic cylinder assembly 100 of the present invention may be assembled in the following manner. First, the wiper assembly 124 is fixed in place with respect to the piston 112. For example, the wiper assembly 124 may be connected to the piston 112 with a snap ring or a like device. In another embodiment, the wiper assembly 124 may be connected to the piston 112 via the rod 118 (e.g., connected to the rod 118 with a snap ring). In a still further embodiment, the wiper assembly 124 may be positioned between the piston 112 and the rod 118. The rod 118 extends through the first cap member 104 of the cylindrical tube 102 and is fixedly connected to the piston 112. The electrical leads 126 coupled (e.g., hard wired) with the linear transducer 120 are wired through the second cap member 108, which may be welded to the second end 110 of the cylindrical tube 102. The wand 122 of the linear transducer 120 is inserted through the cylindrical tube 102, screwed into the base end of the cylindrical tube 102, and tightened against the second cap member 108. For example, a crow's foot (possibly including an extension), or a like tool, may be utilized for tightening a nut holding the linear transducer 120 in place. The piston 112 and the wiper assembly 124 are then moved into the cylindrical tube 102 such that the wiper assembly 124 is moved along the wand 122 of the linear transducer 120. Finally, the first cap member 104 is utilized for closing the first end 106 of the cylindrical tube 102.

This assembly technique is an improvement over previous methods, which required a removable end cap at the base end for access to the wiper assembly. In the present invention, the second cap member 108 may be welded to the cylindrical tube 102, increasing efficiency of construction, efficiency of assembly, and overall cost-effectiveness. Moreover, the wiper assembly 124 may be positioned on the side of the piston 112 or the rod 118 proximal to the first end 106 of the cylindrical tube 102, allowing access to the wiper assembly 124 by decoupling the rod 118 from the piston 112. Further, the wiper assembly 124 may be positioned further down the piston 112, providing a desired startup resistance. For example, in this configuration, the electric circuit completed by the wand 122 and the wiper assembly 124 provides resistance when the piston 112 is at the second position at the second end 110 of the cylindrical tube 102.

In another specific embodiment, illustrated in FIGS. 5 through 8, the second cap member 108 may also include a supplemental cap, such as a plug 128, or the like, for allowing the wand 122 of the linear transducer 120 to be inserted through the second cap member 108 and into the cylindrical tube 102. In this configuration, the end of the linear transducer 120 proximal to the second end 110 of the cylindrical tube 102 may be positioned further from the piston 112 and the wiper assembly 124, providing a desired startup resistance even when the wiper assembly 124 is positioned adjacent to the base end. For example, in this configuration, the electric circuit completed by the wand 122 and the wiper assembly 124 provides resistance when the piston 112 is at the second position at the second end 110 of the cylindrical tube 102. Those of skill in the art will appreciate that a variety of configurations may be utilized for separating the wiper assembly 124 from an end of the linear transducer 120 and providing a desired startup resistance for the electrical circuit formed via the linear transducer 120 and the electrical leads 126 without departing from the scope and intent of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for assembling a hydraulic cylinder, the hydraulic cylinder including a tube having a first end and a second end; a first cap member for closing the first end of the tube, the first cap member having an opening therein; a second cap member for closing the second end of the tube; a piston sealed within the tube for movement between a first position at the first end of the tube and a second position at the second end of the tube; and a rod operatively attached to the piston and extending from the piston through the opening in the first cap member, the piston and the rod movable together between the first position and the second position, comprising:

positioning a transducer within the tube, the transducer including an elongated portion fixed with respect to the second cap member and a follower member fixed with respect to the piston and movable along the elongated portion of the transducer for monitoring the position of the piston with respect to the second cap member, for allowing the transducer to measure the position of the follower member with respect to the elongated portion as the piston moves between the first position at the first end of the tube and the second position at the second end of the tube;

installing the piston within the tube so that the elongated portion of the transducer extends through the follower member, the elongated portion extending beyond the first end of the tube for facilitating engagement of the follower member onto the elongated portion of the transducer, and measuring startup resistance for broken electrical wire diagnostics and/or detecting open faults or shorts.

2. The method as claimed in claim 1, further comprising positioning the follower member so that the follower member is a pre-determined distance from an end of the elongated portion of the transducer when the piston is in the second position at the second end of the tube.

3. The method as claimed in claim 2, wherein the follower member is retained by the piston.

4. The method as claimed in claim 2, wherein the follower member is retained by the rod.

5. The method as claimed in claim 1, wherein the elongated portion is inserted through the second cap member during assembly of the hydraulic cylinder.

* * * * *